United States Patent [19]

Spijker

[11] Patent Number: 4,465,657

[45] Date of Patent: Aug. 14, 1984

[54] PROCESS FOR THE PREPARATION OF PURE SILICON DIOXIDE AND SILICON DIOXIDE OBTAINED BY APPLYING THIS PROCESS

[75] Inventor: Ruud Spijker, Heemskerk, Netherlands

[73] Assignee: Unie van Kunstmestfabrieken B.V., Utrecht, Netherlands

[21] Appl. No.: 493,592

[22] Filed: May 11, 1983

[30] Foreign Application Priority Data

May 11, 1982 [NL] Netherlands .......................... 8201925

[51] Int. Cl.³ ............................................. C01B 33/12
[52] U.S. Cl. ..................................... 423/339; 502/232
[58] Field of Search ....................... 423/335, 338, 339; 502/232

[56] References Cited

U.S. PATENT DOCUMENTS 3,271,107  9/1966  Nickerson et al. ................... 502/232
4,298,586  11/1981  Sikdar ................................. 423/339
4,308,244  12/1981  Sikdar et al. ........................ 423/339

Primary Examiner—Jack Cooper
Attorney, Agent, or Firm—Cushman, Darby & Cushman

[57] ABSTRACT

Process for preparing pure silicon dioxide from a hexafluorosilicic acid solution by controllably and vigorously admixing, stirring or blending a hexafluorosilicic acid solution with a quantity of ammonium hydroxide solution amounting to about 40 to about 75 percent by weight of the quantity stoichiometrically required for the converting hexafluorosilicic acid to ammonium fluoride and silicon dioxide to thereby form a reaction mixture and a precipitate therein; separating out this precipitate; treating the precipitate-free liquid with ammonium hydroxide and then recovering the pure silicon dioxide. The silicon dioxide is pure enough to be useful as a catalyst support or as a substitute for quartz.

10 Claims, No Drawings

PROCESS FOR THE PREPARATION OF PURE SILICON DIOXIDE AND SILICON DIOXIDE OBTAINED BY APPLYING THIS PROCESS

BACKGROUND AND OBJECTS OF THE PRESENT INVENTION

The invention broadly relates to a process for preparing pure silicon dioxide by a two step ammonium hydroxide conversion of hexafluorosilicic acid solution and separating off the precipitated silicon dioxide.

Fluorine containing gases are typically obtained as undesirable by-products during the manufacture of fertilizer, phosphoric acid and the like. For instance, silicon tetrafluoride is often liberated in such processes but may not be discharged to the surrounding environs because of environmental concerns. It therefore must be recovered to prevent environmental problems. However, the recovered and collected silicon tetrafluoride by-product has heretofore generally been regarded as having little commercial value. Consequently efforts have been made to find a economically attractive use for such undesired but collected by-products.

One such attempt is described in U.S. Pat. No. 3,271,107 wherein a 15 to 25 weight percent hexafluorosilicic acid solution is reacted with ammonium hydroxide to produce a product slurry or suspension including numerous extremely small silica nuclei in a first step in a reaction zone of high agitation until a pH of 6–8 has been reached. The thus formed slurry is then treated in a second step for 20 to 120 minutes with less vigorous stirring in the presence of ammonium hydroxide at a pH of 8.3–9.0 and the precipitated silicon dioxide is subsequently separated off from the resulting slurry.

Disadvantageously, this already known process produces a badly contaminated silicon dioxide flocculate product which has limited end-use potential. For instance, the metal content in particular is undesirably high. In practice the thus obtained relatively high metal content flocculate can therefore be used for comparatively few technical purposes such as a paint pigment additive or a rubber product filler.

The present invention now provides a process which makes it possible to obtain a pure silicon dioxide from even highly contaminated hexafluorosilicic acid solutions.

The present invention also provides an improved process for preparing pure silicon dioxide which is suitable for many useful technical purposes.

DESCRIPTION OF THE PRESENT INVENTION

According to the present invention a pure silicon dioxide product is obtained from a hexafluorosilicic acid solution by vigorously admixing, stirring or blending a hexafluorosilicic acid solution with a quantity of ammonium hydroxide solution amounting to about 40 to about 75% by weight of the quantity stoichiometrically required for the conversion to ammonium fluoride and silicon dioxide to thereby form a reaction mixture and a precipitate therein, separating off the thus formed precipitate, treating the remaining solution in a second step with ammonium hydroxide and separating off the pure silicon dioxide precipitate obtained from this second step. Most unexpectedly, and advantageously, the silicon dioxide produced in accordance with the present process will have a significantly reduced trace metal content compared to the silicon dioxide prepared in accordance with U.S. Pat. No. 3,271,107.

The starting material in the present process is a hexafluorosilicic acid solution. The solution is preferably about 10 to about 30% by weight hexafluorosilicic acid solution. More specifically an about 15 to about 20% by weight hexafluorosilicic acid solution is employed. Such a solution can be obtained by diluting or concentrating industrial $H_2SiF_6$ solutions. Such industrial solutions, for example, can be solutions obtained by scrubbing silicon-containing and fluorine-containing off-gases of a phosphate digestion and/or of an evaporation section of a wet-process phosphoric acid manufacturing process. Such solutions generally contain many impurities, particularly metal compounds, which are fairly hard to remove. If so desired, this solution may be subjected to a prior purification step, such as for instance distillation, treatment with absorbents and/or precipitation by addition of certain chemicals.

Preferably and advantageously an about 20 to about 30% by weight ammonium hydroxide solution is employed in both ammonical treatment steps. Generally a total quantity of ammonium hydroxide is used that is about the same as the quantity stoichiometrically required for the conversion of hexafluorosilicic acid to ammonium fluoride and silicon dioxide. By preference about 50 to about 60% by weight of this total quantity is supplied in the first ammonium hydroxide step. As will be appreciated, suitably regulated quantities of ammonia may also be used to form an ammonium hydroxide solution in situ in the first step ammonical treatment of the hexafluorosilicic acid.

The temperature during the conversion may vary. It has been found that the conversion rate will be rather slow if low temperatures are employed. At high temperature during conversion the silicon dioxide will precipitate in a coarse form. The coarse silicon dioxide, unfortunately, has a fairly small specific surface area and is therefore hard to wash.

Advantageously, and preferably, the temperature is maintained in the present process between about 25° C. and about 50° C. More specifically, the temperature ranges between about 30° C. and about 40° C. To attain this result, the reaction mixture should generally be cooled during the conversion since the reaction is exothermic.

It has now been found that in order to obtain an easily separable and washable silicon dioxide precipitate a proper and uniform mixing of the reactants is important. This is preferably effected by metering the reactants continuously, simultaneously, but gradually to a well stirred and agitated reactor in both ammonium hydroxide steps.

The reaction mixture formed in the first step consists substantially of a solution of ammonium fluoride and di-ammonium hexafluorosilicate with a quantity of precipitate. The precipitate is separated off. For instance, filtration, decantation or centrifugation are suitable precipitate separation techniques. This precipitate substantially contains silicon dioxide and metal compounds, and can, after washing, if so desired, be used as a filler for rubber products or as an additive to pigments, etc. The filtrate or remaining reaction liquid after separation treatment is substantially precipitate-free.

Without the precipitate separation step prior to the second ammonium hydroxide treatment of the filtrate a silicon dioxide product containing undesirably high quantities of metal contaminants is obtained and the reduced surface area of the silicon dioxide is, compared to silicon dioxide obtained by the present process, very significant.

After separating off the precipitate, the liquid remaining, i.e. filtrate, can subsequently be fed directly to the second step.

Preferably, however, the filtrate is first treated with an ion exchanger, so that in the second step an even purer silicon dioxide results. Moreover, it has been found that as a result of this treatment in the second step a silicon dioxide is obtained having a substantially larger specific surface. For this treatment preference is given to using a chelating, weakly acidic cation exchanger. Exemplary ion exchangers are described in, for instance Chemicals Engineer's Handbook by J. H. Perry, 4th Edition, page 16-2 to 16-40 (Mc. Graw-Hill Book Co, New York, 1963), the complete disclosure of which is hereby incorporated by reference. A suitable exemplary weakly acidic cation exchange resin is available from BioRad under the brand name Chelex-100.

The reaction mixture formed in the second ammonium hydroxide step consists substantially of an ammonium fluoride solution with solid silicon dioxide precipitate. The silicon dioxide is then separated off, for instance, by filtration, decantation or centrifugation. This pure silicon dioxide product has a very low metal impurities content. Therefore the technical applications are greater in number than with the silicon dioxide products of the prior art process and includes applications for which such prior art silicon dioxides of hexafluorosilicic origin are illsuited. For instance, the silicon dioxide produced by the present process may be used as a quartz substitute or as starting material for catalyst carrier material. In this latter regard, reference is made to the complete disclosure of the simultaneously filed U.S. application Ser. No. 493,401, titled Process for Preparing Pure Silicon Dioxide Having High Mechanical Strength, as well as Silicon Dioxide Obtained by Applying This Process. A great advantage compared with industrial silica, prepared from sodium silicate, is that the present product is virtually free of sodium, so that it is sinterproof. Preference, however, is given to washing the precipitate, by which the heavy metal content can even be further substantially reduced. Suitable washing liquids include neutral, weakly basic, as well as weakly acidic liquids. Preference is given to washing the precipitate with a dilute mineral acid, for instance nitric or hydrochloric acid. If so desired, the diluted mineral acid wash may be preceded by washing the precipitate with water. In particular the dilute mineral acid wash will further reduce the calcium and the fluorine content of the purified silicon dioxide.

After separating off the silicon dioxide precipitate in the process according to the present invention, a reaction liquid will result consisting substantially of an ammonium fluoride solution. This solution can be worked up by well known methods, for instance by concentration, to technical-grade ammonium fluoride, or can be converted into, for instance, alkali metal fluorides, aluminium fluoride or hydrogen fluoride.

The following non-limiting examples further illustrate the present invention.

EXAMPLE I

To a first reactor provided with a cooler and stirrer 910 g/hour of an $H_2SiF_6$ solution in a concentration of 18% by weight and 290 g/hour of an $NH_4OH$ solution in a concentration of 25% by weight were supplied continuously and simultaneously. The $H_2SiF_6$ solution had been obtained by diluting with demineralized water a crude 35.8% by weight $H_2SIF_6$ solution from the evaporation section of a phosphate processing plant. The dilute solution had a fluorine and $P_2O_5$ content of 14.4% by weight and 0.23% by weight respectively and contained, in addition to 330 ppm chlorine, substantial quantities of metals, such as 30 ppm Na, 223 ppm Ca, 64 ppm Fe, 16 ppm As.

The reactants residence time in this first reactor was about 15 minutes, while the temperature was kept between about 30° C. and 40° C. The reaction mixture which formed was successively filtered over a glass filter and the resulting filtrate (pH 7.25) was passed to a second reactor provided with stirrer and cooler, to which reactor a 25% by weight $NH_4OH$ solution was supplied simultaneously. The filtrate and the $NH_4OH$ solution were metered to this second reactor a rate of respectively 1820 g/hour and 290 g/hour.

The residence time of the reactants in this second reactor was about 8 minutes, while the temperature was kept between about 30° C. and 40° C.

The second reaction mixture formed was successively filtered over a glass filter, and the $NH_4F$ solution (pH 8.85) obtained in the form of a clear filtrate was carried off. The filter cake was washed on the filter six times with demineralized water, dried at 150° C. and subsequently analyzed. The results of this analysis are summarized in Table 1.

EXAMPLE II

The process of Example I was repeated so, however, that the filtrate obtained after filtration of the reaction mixture from the first reactor was passed through three columns (length 10 cm, diameter 12 mm) consisting of a chelating, weakly acidic cation exchange resin available under the name of Chelex-100 of the firm of BioRad. The resin was subjected to a prior treatment with a 10% by weight $H_2SiF_6$ solution for about 1 hour, subsequently filtered and washed, then suspended in an $(NH_4)_2SiF_6$-containing salt solution and washed again.

The washed filter cake ultimately obtained was analyzed. The results are summarized in Table 1.

COMPARATIVE EXAMPLE A

In the same way as in Example I an 18% by weight $H_2SiF_6$-solution was converted with a 25% by weight $NH_4OH$-solution, but without intermediate filtering-off of the mixture. The filter cake ultimately obtained was washed and analyzed. The results of this analysis are also summarized in Table I.

TABLE I

| | Comparative Example A | Example I | Example II |
|---|---|---|---|
| Sodium | 270 ppm | 225 ppm | 150 ppm |
| Iron | 250 ppm | 177 ppm | 36 ppm |
| Copper | 0.7 ppm | 0.6 ppm | 0.5 ppm |
| Nickel | 1.3 ppm | 0.8 ppm | 0.6 ppm |
| Chromium | 20 ppm | 3 ppm | 4 ppm |
| Cobalt | 0.05 ppm | 0.05 ppm | <0.05 ppm |
| Manganese | 16 ppm | 5.6 ppm | 0.3 ppm |
| Vanadium | 10 ppm | 1.4 ppm | <0.1 ppm |
| Specific Surface | 12 m²/g | 73 m²/g | 260 m²/g |

These results clearly show that, compared with the known processes, the process according to the invention results in a product having a substantially lower content of metal impurities. Particularly the Fe, Cr, Mn and V trace impurities content has been substantially reduced. The treatment with the ion exchanger causes the content of particularly Fe, Mn and V to be reduced even further.

Moreover, it will be found that in applying the process according to the invention a product is obtained having a much larger specific surface, particularly if a treatment with an ion exchanger has take place. This is significant as far as expanding the number of possible end use applications while simplifying subsequent treatments.

EXAMPLE III

Parts of the filter cakes obtained in Examples 1 and 2 were washed six times with different washing liquids, subsequently dried at 150° C., upon which the fluorine content and the specific surface of the product were determined. the results are summarized in Table II.

TABLE II

| Filter cake | Washing liquid | Fluorine content in ppm | Specific surface in $m^2/g$ |
| --- | --- | --- | --- |
| Example I | None | 176.000 | — |
| Example I | Water | 66 | 73 |
| Example I | 1%-$(NH_4)_2CO_3$—sol. | 52 | 167 |
| Example I | 1%-$NH_3$—sol. | 92 | 107 |
| Example I | 1%-HCl—sol. | 825 | 200 |
| Example II | None | >100.000 | — |
| Example II | Water | 70 | 260 |
| Example II | 1%-$(NH_4)_2CO_3$—sol. | 53 | 204 |
| Example II | 1%-$NH_3$—sol. | 23 | 178 |
| Example II | 1%-HCl—sol | 1.140 | 305 |

It is clear that by washing, particularly with neutral or subalkaline washing liquids, a strong decline in the content of fluorine compounds of the product will result.

EXAMPLE IV

Part of the filter cake obtained in applying the process according to Example 1 was treated, after washing with water and after drying, with a 1% by weight HCl solution for 4 hours, subsequently filtered, rewashed with water and dried. On analysis it was found that the calcium content has decreased from about 600 ppm to 100 ppm and the iron content from 177 ppm to 42 ppm.

While the presently considered most practical and preferred embodiments have how been described, it should be understood that such description is not intended to limit the scope of the following claims. The claim scope is intended to cover various modification and equivalent processes.

I claim:

1. A process for preparing purified silicon dioxide in a two step ammonical conversion of hexafluorosilicic acid to silicon dioxide comprising the combination of steps of:
   (a) controllably and vigorously admixing a hexafluorosilicic acid solution and an ammonium hydroxide solution to form a reaction mixture and precipitate wherein said ammonium hydroxide solution is about 40 weight percent to 75 weight percent of the ammonium hydroxide stoichiometrically required for converting the hexafluorosilicic acid admixed therewith to ammonium fluoride and silicon dioxide;
   (b) separating said precipitate from said reaction mixture to form a substantially precipitate-free reaction liquid;
   (c) treating said precipitate-free liquid with ammonium hydroxide to thereby obtain a pure silicon dioxide precipitate; and
   (d) recovering said pure silicon dioxide precipitate.

2. Process according to claim 1, wherein a temperature of about 25° C. to about 50° C. is maintained in steps (a) and (c).

3. Process according to claim 1, wherein in said steps (a) and (c) reactants are controllably supplied both continuously and simultaneously to a stirred reactor.

4. Process according to claim 3, wherein in said step (a) about 50 to about 60 by weight of the quantity of ammonium hydroxide stoichiometrically required for converting hexafluorosilicic acid to silicon dioxide is used.

5. Process according to claim 4, wherein said step (b) further includes treating said precipitate-free liquid with an ion-exchanger.

6. Process according to claim 5, wherein said ion exchanger is a chelating, weakly acidic cation exchanger.

7. Process according to claim 1, wherein the precipitate obtained from step (d) is washed.

8. Process according to claim 7, wherein said washing is done with water, dilute mineral acids, or a weakly basic solution.

9. Process according to claim 7, wherein said washing comprises:
   (i) washing said precipitate with water; and
   (ii) then subsequently washing said precipitate with a dilute mineral acid.

10. A process for preparing purified silicon dioxide in a two step ammonical conversion of hexafluorosilicic acid to silicon dioxide comprising the combination of steps of:
   (a) controllably and vigorously admixing a hexafluorosilicic acid solution and an ammonium hydroxide solution to form a reaction mixture and a precipitate at a temperature of about 25° C. to 50° C. wherein said ammonium hydroxide solution is about 50 weight percent to 60 weight percent of the ammonium hydroxide stoichiometrically required for converting the hexafluorosilicic acid admixed therewith to ammonium fluoride and silicon dioxide;
   (b) separating said precipitate from said reaction mixture to form a substantially precipitate-free reaction liquid;
   (c) subjecting said precipitate-free reaction liquid to ion exchange treatment;
   (d) treating said ion-exchange-treated liquid with ammonium hydroxide to thereby obtain a pure silicon dioxide precipitate at a temperature of about 25° C. to about 50° C.;
   (e) washing said precipitate first with water and then with a dilute mineral acid; and
   (f) recovering said pure silicon dioxide precipitate.

* * * * *